United States Patent
Depraete et al.

(10) Patent No.: US 9,593,755 B2
(45) Date of Patent: *Mar. 14, 2017

(54) HYDROKINETIC TORQUE COUPLING DEVICE HAVING TURBINE-PISTON LOCKUP CLUTCH, AND RELATED METHODS

(71) Applicant: VALEO EMBRAYAGES, Amiens (FR)

(72) Inventors: Alexandre Depraete, Bloomfield, MI (US); David Werthman, Royal Oak, MI (US)

(73) Assignee: Valeo Embrayages (FR)

( * ) Notice: Subject to any disclaimer, the term of this patent is extended or adjusted under 35 U.S.C. 154(b) by 115 days.

This patent is subject to a terminal disclaimer.

(21) Appl. No.: 14/562,064

(22) Filed: Dec. 5, 2014

(65) Prior Publication Data

US 2016/0160973 A1 Jun. 9, 2016

(51) Int. Cl.
*F16H 45/02* (2006.01)
*F16F 15/129* (2006.01)
*F16F 15/139* (2006.01)

(52) U.S. Cl.
CPC .......... *F16H 45/02* (2013.01); *F16F 15/1292* (2013.01); *F16F 15/1392* (2013.01);
(Continued)

(58) Field of Classification Search
CPC ............ F16H 45/02; F16H 2045/0205; F16H 2045/0231; F16H 2045/0263; F16H 2045/0278
(Continued)

(56) References Cited

U.S. PATENT DOCUMENTS 2,130,895 A   9/1938  Ness
2,860,747 A   11/1958 Kelley
(Continued)

FOREIGN PATENT DOCUMENTS

DE   1550957 A1   7/1969
DE   2245901 A1   4/1974
(Continued)

OTHER PUBLICATIONS

Lindemann et al., "iTC—Innovative Solutions for Torque Converters Pave the Way into the Future", Torque Converter 20, pp. 280-301.
(Continued)

*Primary Examiner* — Richard Lorence
(74) *Attorney, Agent, or Firm* — Berenato & White, LLC (57) ABSTRACT

A hydrokinetic torque coupling device includes an impeller, a casing having a first engagement surface, a turbine-piston hydrodynamically drivable by the impeller, and a biasing device. The turbine-piston is hydrodynamically drivable by the impeller and includes a turbine-piston shell having a second engagement surface facing the first engagement surface. The turbine-piston is axially displaceable relative to the impeller between a hydrodynamic transmission mode and a lockup mode. The biasing device is configured to exert an axial load against the turbine-piston to urge the turbine-piston axially away from the lockup mode and towards the hydrodynamic transmission mode. The axial load exerted by the biasing device decreases as the turbine-piston moves axially towards the lockup mode and increases as the turbine-piston moves axially away from the lockup mode.

20 Claims, 9 Drawing Sheets

(52) U.S. Cl.
CPC ............... *F16H 2045/0205* (2013.01); *F16H 2045/0231* (2013.01); *F16H 2045/0263* (2013.01); *F16H 2045/0278* (2013.01)

(58) Field of Classification Search
USPC .............................................. 192/3.28–3.31
See application file for complete search history.

(56) References Cited

U.S. PATENT DOCUMENTS

| | | | |
|---|---|---|---|
| 2,992,713 | A | 7/1961 | Stump et al. |
| 3,041,892 | A | 7/1962 | Schjolin |
| 3,252,352 | A | 5/1966 | General et al. |
| 4,041,701 | A | 8/1977 | Goto et al. |
| 5,713,442 | A | 2/1998 | Murata et al. |
| 5,813,505 | A | 9/1998 | Olsen et al. |
| 6,026,940 | A | 2/2000 | Sudau |
| 6,915,886 | B2 | 7/2005 | Dacho et al. |
| 7,191,879 | B2 | 3/2007 | Arhab et al. |
| 7,445,099 | B2 | 11/2008 | Maucher et al. |
| 8,276,723 | B2 | 10/2012 | Verhoog et al. |
| 8,479,901 | B2 * | 7/2013 | Engelmann ..... F16H 2045/0263 192/3.28 |
| 9,341,250 | B1 * | 5/2016 | Depraete ............ F16H 45/0263 |
| 2003/0168298 | A1 | 9/2003 | Holler et al. |
| 2003/0168299 | A1 | 9/2003 | Holler et al. |
| 2004/0011032 | A1 | 1/2004 | Holler et al. |
| 2006/0086584 | A1 | 4/2006 | Maucher et al. |
| 2013/0230385 | A1 | 9/2013 | Lindemann et al. |
| 2014/0014454 | A1 | 1/2014 | Davis |
| 2014/0014455 | A1 | 1/2014 | Davis |
| 2014/0097055 | A1 | 4/2014 | Lindemann et al. |
| 2014/0110207 | A1 | 4/2014 | Davis |
| 2015/0362041 | A1 | 12/2015 | Lee et al. |
| 2016/0245384 | A1 * | 8/2016 | Frary ..................... F16H 45/02 |

FOREIGN PATENT DOCUMENTS

| | | |
|---|---|---|
| DE | 10226860 A1 | 12/2003 |
| EP | 0125428 A1 | 11/1984 |
| EP | 1744074 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2736982 A1 | 1/1997 |
| FR | 2787854 A1 | 6/2000 |
| GB | 598811 | 2/1948 |
| JP | 58-131466 A | 8/1983 |
| KR | 101311531 B1 | 9/2013 |
| WO | WO2004018897 | 3/2004 |
| WO | 2004046574 A1 | 6/2004 |

OTHER PUBLICATIONS

U.S. Appl. No. 14/510,244, filed Oct. 9, 2014, First Named Inventor: Alexandre Depraete.
U.S. Appl. No. 14/510,267, filed Oct. 9, 2014, First Named Inventor: Alexandre Depraete.
U.S. Appl. No. 14/522,189, filed Oct. 23, 2014, First Named Inventor: Alexandre Depraete.
U.S. Appl. No. 14/522,263, filed Oct. 23, 2014, First Named Inventor: Alexandre Depraete.
U.S. Appl. No. 14/522,302, filed Oct. 23, 2014, First Named Inventor: Alexandre Depraete.
U.S. Appl. No. 14/522,333, filed Oct. 23, 2014, First Named Inventor: Alexandre Depraete.
U.S. Appl. No. 14/522,361, filed Oct. 23, 2014, First Named Inventor: David Werthman.
U.S. Appl. No. 14/522,372, filed Oct. 23, 2014, First Named Inventor: Alexandre Depraete.
U.S. Appl. No. 14/522,393, filed Oct. 23, 2014, First Named Inventor: Alexandre Depraete.
U.S. Appl. No. 14/561,961, filed Dec. 5, 2014, First Named Inventor: Alexandre Depraete.
U.S. Appl. No. 14/562,022, filed Dec. 5, 2014, First Named Inventor: Alexandre Depraete.
U.S. Appl. No. 14/562,099, filed Dec. 5, 2014, First Named Inventor: Alexandre Depraete.
U.S. Appl. No. 14/562,136, filed Dec. 5, 2014, First Named Inventor: Alexandre Depraete.
U.S. Appl. No. 14/562,216, filed Dec. 5, 2014, First Named Inventor: Sungchul Lee.
U.S. Appl. No. 14/562,253, filed Dec. 5, 2014, First Named Inventor: Alexandre Depraete.
U.S. Appl. No. 14/562,286, filed Dec. 5, 2014, First Named Inventor: Alexandre Depraete.
U.S. Appl. No. 14/687,602, filed Apr. 15, 2015, First Named Inventor: Alexandre Depraete.

* cited by examiner

HYDROKINETIC TORQUE COUPLING DEVICE HAVING TURBINE-PISTON LOCKUP CLUTCH, AND RELATED METHODS

BACKGROUND OF THE INVENTION

1. Field of the Invention

The present invention generally relates to torque converters and hydrokinetic torque coupling devices, and more particularly to a torque converter and a hydrokinetic torque coupling device including a turbine-piston lockup clutch for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. No. 8,276,723 and U.S. Pat. No. 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, there is provided a hydrokinetic torque coupling device for coupling together a driving shaft and a driven shaft. The hydrokinetic torque coupling device of this first aspect includes an impeller rotatable about a rotational axis and having an impeller shell, a casing, a turbine-piston hydrodynamically drivable by the impeller, and a biasing device. The casing includes the impeller shell and a casing shell fixedly connected to so as to be non-rotatable relative to the impeller shell, and has a first engagement surface. The turbine-piston includes a turbine-piston shell having a second engagement surface facing the first engagement surface, and is axially displaceable relative to the impeller between a lockup axial position and a maximum axial displacement position. In the lockup axial position, the first and second engagement surfaces are frictionally engaged with one another to mechanically lock the turbine-piston with the casing so as to be non-rotatable relative to the casing. The biasing device is configured exert an axial load against the turbine-piston to urge the turbine-piston axially away from the lockup mode and towards the hydrodynamic transmission mode, wherein the axial load exerted by the biasing device decreases as the turbine-piston moves axially towards the lockup mode and increases as the turbine-piston moves axially away from the lockup mode.

A second aspect of the invention provides a hydrokinetic torque coupling device for coupling together a driving shaft and a driven shaft. The torque coupling device includes an impeller rotatable about a rotational axis and comprising an impeller shell, a casing, a turbine-piston hydrodynamically drivable by the impeller, a stator situated between the impeller and the turbine-piston, a biasing device, an output hub, and a damper assembly interconnecting the turbine-piston to the output hub. The casing includes the impeller shell and a casing shell fixedly connected to so as to be non-rotatable relative to the impeller shell, and has a first engagement surface. The turbine-piston includes a turbine-piston shell having a second engagement surface facing the first engagement surface. The turbine-piston is axially displaceable relative to the impeller between a hydrodynamic transmission mode in which the first and second engagement surfaces are spaced from and not frictionally engaged with one another, and a lockup mode in which the first and second engagement surfaces are frictionally engaged with one another to mechanically lock the turbine-piston with the casing so as to be non-rotatable relative to the casing. The biasing device is configured to exert an axial load against the turbine-piston to urge the turbine-piston axially away from the lockup mode and towards the hydrodynamic transmission mode, wherein the axial load exerted by the biasing device decreases as the turbine-piston moves axially towards the lockup mode and increases as the turbine-piston moves axially away from the lockup mode.

A third aspect of the invention provides a method of assembling a hydrokinetic torque coupling device for coupling a driving shaft and a driven shaft together. The method is performed with a torque converter that is rotatable about a rotational axis and includes an impeller having an impeller shell, a turbine-piston hydrodynamically drivable by the impeller and including a turbine-piston shell, and a biasing device. A casing shell is operatively connected to the impeller shell of the torque converter to form a casing that is rotatable about the rotational axis and has a first engagement surface. The turbine-piston is axially displaceable relative to the impeller between a lockup axial position and a maximum axial displacement position. In the lockup axial position, the first and second engagement surfaces are frictionally engaged with one another to mechanically lock the turbine-piston with the casing so as to be non-rotatable relative to the casing. The biasing device is configured to exert an axial load against the turbine-piston to urge the turbine-piston axially away from the lockup mode and towards the hydrodynamic transmission mode, wherein the axial load exerted by the biasing device decreases as the turbine-piston moves axially towards the lockup mode and increases as the turbine-piston moves axially away from the lockup mode.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

Figure 1:
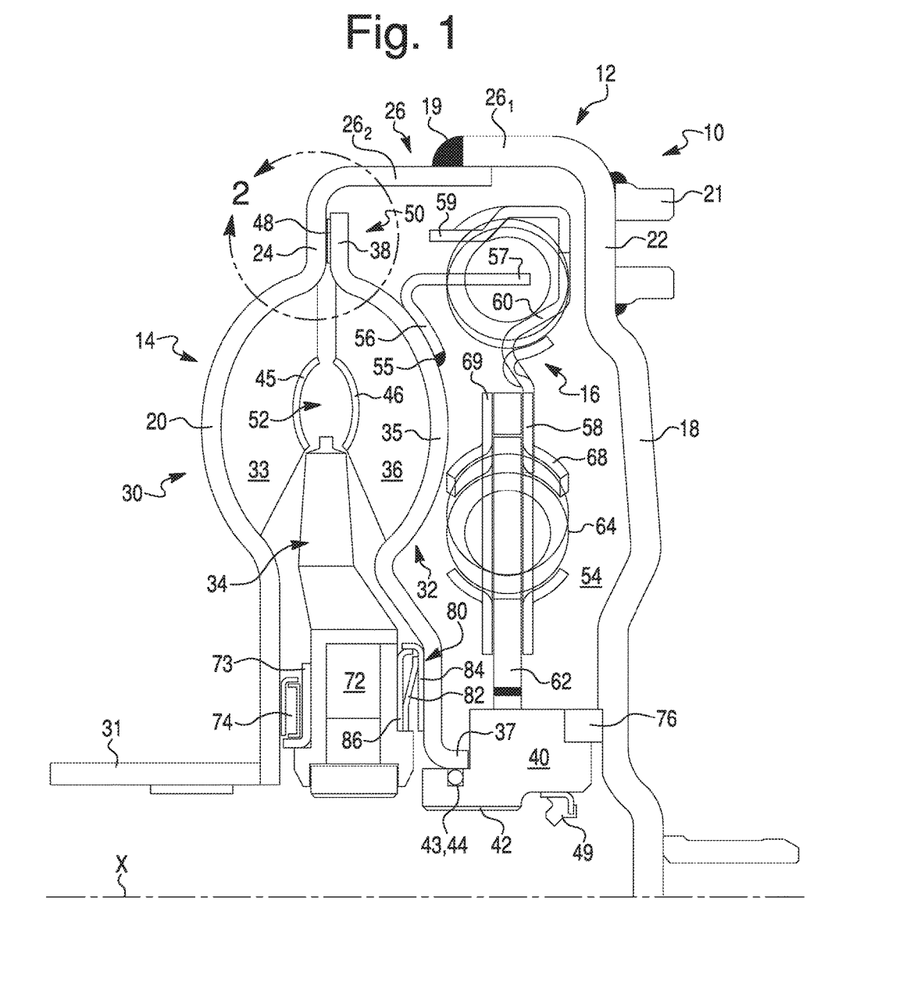
FIG. 1 is a fragmented half-view in axial section of a hydrokinetic torque coupling device equipped with a turbine-piston in accordance with a first exemplary embodiment of the present invention.

A first exemplary embodiment of a hydrokinetic torque coupling device is generally represented in the accompanying drawings by reference numeral 10, as best shown in the fragmentary sectional view in FIG. 1. The hydrokinetic torque coupling device 10 is operable to fluidly or mechanically couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14 and a torsional vibration damper (also referred to herein as a damper assembly) 16 are all rotatable about a rotational axis X. The drawings discussed herein show half-views, that is, the cross-section of a portion or fragment of the hydrokinetic torque coupling device 10 above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell 18 and a second casing shell 20 fixedly and sealingly connected together, such as by weld 19 at their outer peripheries, so as to be non-movable relative to one another yet rotatable about the axis X. The first shell 18 is interconnected to and non-movable relative to the driving shaft, more typically a flywheel (not shown) that is non-rotatably fixed to the driving shaft, so that the casing 12 rotates at the same speed that the engine operates. Specifically, in the illustrated embodiment of FIG. 1 the casing 12 is rotatably driven by the internal combustion engine and is coupled and non-rotatable relative to the flywheel thereof with studs 21, shown in FIG. 1. Each of the first and second casing shells 18, 20 may be made, for example, integrally by press-forming one-piece metal sheets.

Figure 2:
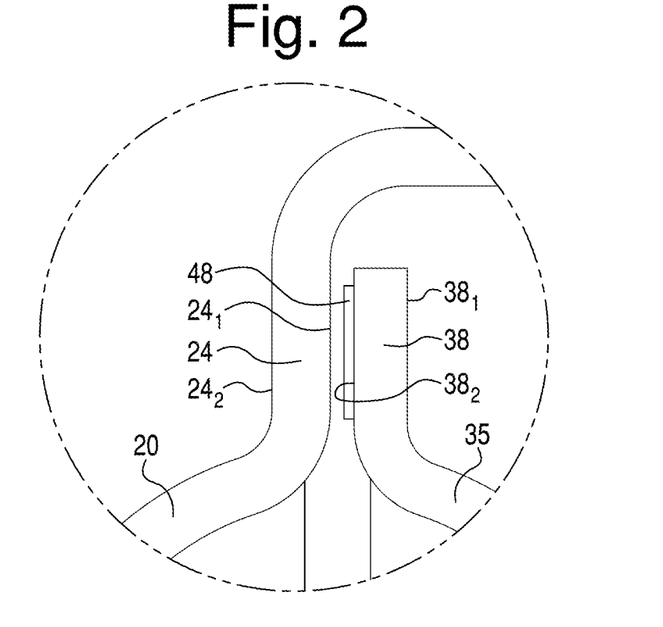
FIG. 2 is an enlarged view of a fragment of the hydrokinetic torque coupling device within circle 2 of FIG. 1 out of lockup mode.
Figure 3:
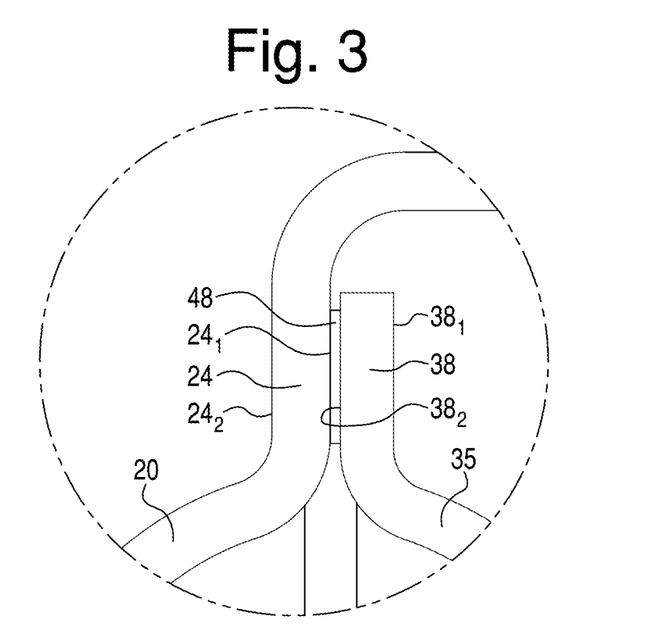
FIG. 3 is an enlarged view of the fragment of the hydrokinetic torque coupling device within circle 2 of FIG. 1, but with the hydrokinetic torque coupling device shown in the lockup mode.
Figure 4:
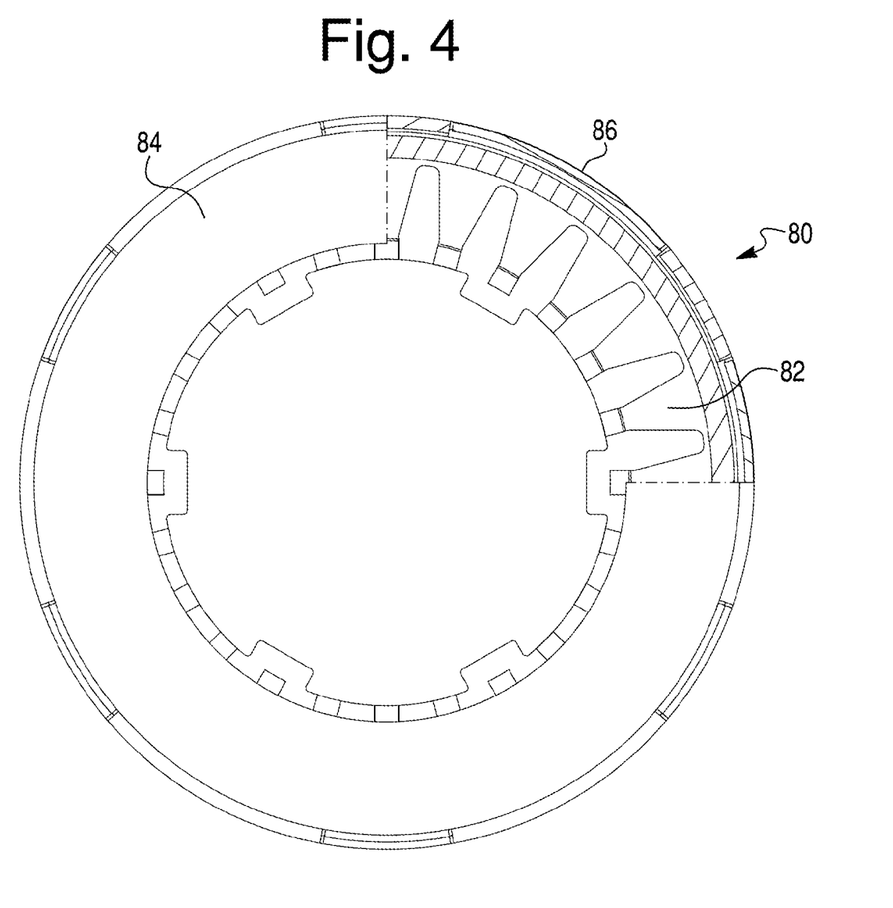
FIG. 4 is an enlarged front view of a nonlinear biasing and bearing device of the hydrokinetic torque coupling device of FIG. 1, showing a turbine-side retainer member of the nonlinear biasing and bearing device partially cut away.
Figure 5:
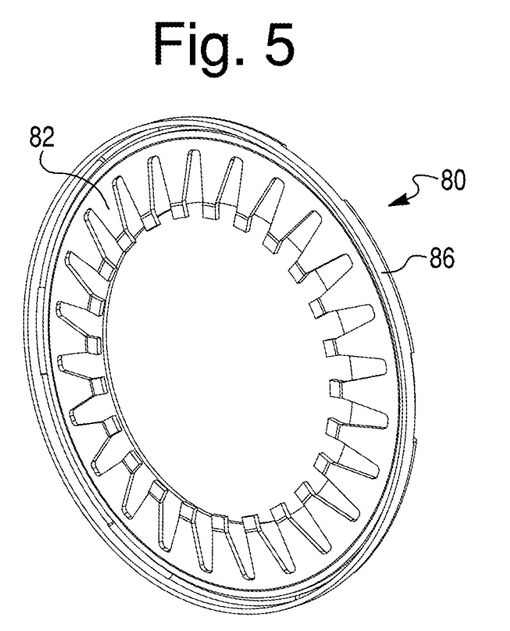
FIG. 5 is an enlarged front perspective view of the nonlinear biasing and bearing device of FIG. 4 with the turbine-side retainer member of the nonlinear biasing and bearing device omitted.
Figure 6:
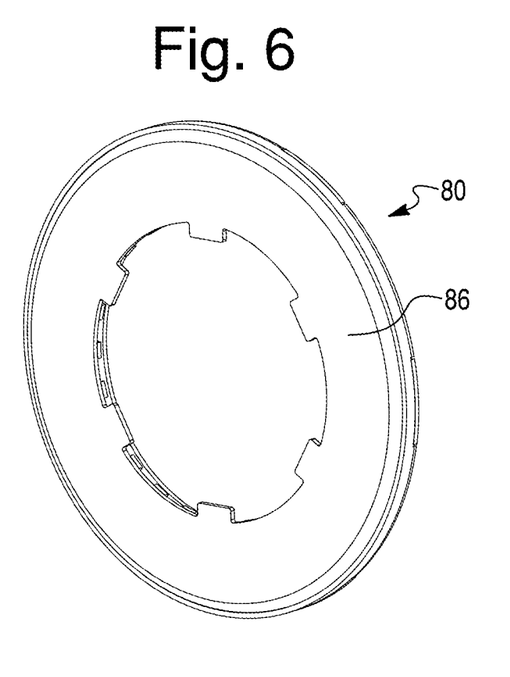
FIG. 6 is an enlarged rear perspective view of the nonlinear biasing and bearing device of FIG. 4

The first casing shell 18 includes a first sidewall portion 22 extending substantially radially relative to the direction from the rotational axis X (i.e., in a plane that is generally transverse to the rotational axis X) and a cylindrical first outer wall portion $26_1$ extending substantially axially from the first sidewall portion 22 toward the second casing shell 20. Similarly, the second casing shell 20 includes a second sidewall portion 24 extending substantially radially relative to the direction from the rotational axis X and a cylindrical second outer wall portion $26_2$ extending substantially axially from the second sidewall portion 24 toward the first casing shell 18. As best shown in FIGS. 2 and 3, the second sidewall portion 24 includes a first engagement surface $24_1$ facing in the first shell 18 and a second surface $24_2$ facing away from the first shell 18. The first and second outer wall portions $26_1$, $26_2$ collectively establish an annular outer wall 26 substantially parallel with the rotation axis X. The weld 19 outside the casing 12 fixedly secures the outer wall portions $26_1$ and $26_2$ together. Although not shown, the casing 12 may include additional components, such as an annular cylindrical shell welded at opposite ends to and interconnecting the first and second outer wall portions $26_1$, $26_2$ together.

The torque converter 14 includes an impeller (sometimes referred to as the pump or impeller wheel) 30, a turbine-piston 32, and a stator (sometimes referred to as the reactor) 34 situated axially between and operatively connecting the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The second casing shell 20 of the casing 12 also forms and serves as the impeller shell of the impeller 30. Accordingly, the impeller shell 20 sometimes is referred to as part of the casing 12. The impeller 30 further includes an impeller core ring 45, and a plurality of impeller blades 33 fixedly attached, such as by brazing, to the impeller shell 20 and the impeller core ring 45. The impeller 30, including its shell 20, the impeller core ring 45, and the impeller blades 33, is secured to the first casing shell 18 by the weld 19 so as to be non-rotatable relative to the casing 12 and hence to the drive shaft (or flywheel) of the engine so that the impeller 30 rotates at the same speed as the engine output shaft. The impeller 30 includes an impeller hub 31 fixedly secured to the impeller shell 20. The impeller hub 31 is arranged for engagement with a hydraulic pump of the transmission.

The turbine-piston 32 is a consolidation or incorporation of a turbine with a lockup clutch piston. The turbine component of the turbine-piston 32 includes a turbine-piston shell 35, a turbine-piston core ring 46, and a plurality of turbine-piston blades 36 fixedly attached, such as by brazing, to the turbine-piston shell 35 and the turbine-piston core ring 46. In the hydrodynamic transmission mode, spinning of the impeller 30 causes transmission fluid in the torus to spin the turbine blades 36, and hence the turbine-piston core ring 46 and the turbine-piston shell 35. The impeller shell 20 and the turbine-piston shell 35 collectively define a substantially toroidal inner chamber (or torus chamber) 52 therebetween. As discussed in further detail below, a drive component 56 is affixed to the turbine-piston shell 35, such as by an annular weld 55 and/or fasteners.

The piston component of the turbine-piston 32 includes a substantially annular, planar (i.e., flat) turbine-piston flange (or turbine-piston wall) 38. The turbine-piston flange 38 is distal to the rotational axis X relative to a proximal flange 37 discussed below. The turbine-piston flange 38 extends from the end of a substantially toroidal portion of the turbine-piston shell 35. As illustrated in FIG. 1, the turbine-piston flange 38 is disposed radially outside of the turbine-piston blades 36, whereas the substantially toroidal portion of the turbine-piston shell extends axially adjacent to the turbine-piston blades 36. The turbine-piston flange 38 and the turbine-piston shell 35 are embodied as integral with one another, e.g., made of a single or unitary component. Alternatively, the turbine-piston flange 38 and the turbine-piston shell 35 may be separate components connected together by a weld or fasteners. The turbine-piston flange 38 extends from a radially outer peripheral end of the turbine-piston shell 35 radially outward, transverse to rotational axis X, to terminate at an end in spaced relationship to the inner peripheral surface of the annular outer wall portion $26_2$ of the casing 12.

Returning to FIGS. 2 and 3, the turbine-piston flange 38 has a first surface $38_1$ and an opposite second engagement surface $38_2$ respectively facing away from and towards the first engagement surface $24_1$ of the second sidewall portion 24. The first and second engagement surfaces $24_1$ and $38_2$ are parallel to and face one another, and extend radially at a 90 degree angle relative to the rotational axis X. Alternatively, the first and second engagement surfaces may be obliquely angled relative to the rotational axis X to define a conical shape. The second engagement surface $38_2$ faces and, as explained below, is movable axially toward and away from the first engagement surface $24_1$ to position the coupling device 10 into and out of a lockup mode, respectively.

In accordance with the first exemplary embodiment, the second engagement surface $38_2$ includes a friction ring (or friction lining) 48, best shown in FIGS. 2 and 3. The friction ring 48 may be secured to the second engagement surface $38_2$, for example, by adhesive bonding and/or with fasteners. The friction ring 48 is made of a friction material for improved frictional performance. Alternatively, a friction ring (or friction lining) may be secured to the first engagement surface $24_1$. According to still another embodiment, the first engagement surface $24_1$ includes a first friction ring or liner and the second (engagement) surface $38_2$ includes a second friction ring or liner. It is within the scope of the invention to omit one or both of the friction rings.

Returning to FIG. 1, the stator 34 is positioned axially between the impeller 30 and the turbine-piston 32 to redirect fluid from the turbine-piston 32 back to the impeller 30 in an efficient manner. The stator 34 is typically mounted on a one-way clutch 72 to prevent the stator 34 from counter-rotation. A thrust bearing 74 is shown situated between a side wall plate 73 of the stator 34 and the impeller shell 20 of the casing 12.

The hydrokinetic torque coupling device 10 further includes an output hub 40 that is rotatable about the rotational axis X. The output hub 40 is operatively coupled to and coaxial with the driven shaft. For example, the output hub 40 may be provided with internal splines 42 for coupling the output hub 40 non-rotatably relative to the driven shaft, such as a transmission input shaft, provided with complementary external splines or grooves. Alternatively, a weld or other connection may be used to fix the output hub 40 to the driven shaft. A sealing member 49 is mounted to a radially inner peripheral surface of the output hub 40 to create a seal at the interface of a transmission input shaft (not shown) and the output hub 40. A radially outer surface of the output hub 40 includes an annular slot 43 for receiving a sealing member, such as an O-ring 44.

Extending axially at a radially inner peripheral end of the turbine-piston shell 35 is a substantially cylindrical flange 37 that is proximate to the rotational axis. The substantially cylindrical flange 37 of the turbine-piston 32 is rotatable relative to the output hub 40. The sealing member (e.g., O-ring) 44 received in the slot 43 creates a seal at the interface of the substantially cylindrical flange 37 and the output hub 40. As discussed in further detail below, the turbine-piston 32 is axially movably relative to the output hub 40 along this interface. Abutment of the end of the flange 37 against the output hub 40, as shown in FIG. 1, limits axial displacement of the turbine-piston 32 to a maximum axial displacement position. The output hub 40 thus acts as a stop feature with respect to axial displacement of the turbine-piston 32.

In the lockup mode, the first and second engagement surfaces $24_1$ and $38_2$ (including the friction ring(s) 48 secured thereto) are pressed together such that the turbine-piston flange 38 is frictionally non-rotatably coupled to the second radial portion 24 of the casing 12, thereby mechanically locking the turbine-piston 32 to the casing 12 in the lockup mode. When not in the lockup mode, including at the maximum axial displacement position, the first and second engagement surfaces $24_1$ and $38_2$ are spaced from one another, such that the turbine-piston flange 38 is not frictionally non-rotatably coupled to the second radial portion 24 of the casing 12. In the non-lockup mode, normal operation of the torque converter 14 selectively fluidly couples and decouples the impeller 30 to and from the turbine-piston 32.

The damper assembly 16 is housed in the casing 12 axially between the turbine-piston 32 and the first casing shell 18, as shown in FIG. 1. The damper assembly 16 is connected to the drive member 56, and includes a plurality of first (or radially outer) circumferential elastic damping members 60, an intermediate member 58 drivenly coupled to the drive member 56 through the first circumferential damping members 60, a plurality of second (or radially inner) circumferential elastic damping members 64, and a driven (or output) member 62 drivenly coupled to the intermediate member 58 through the second circumferential damping members 64. The first circumferential damping members 60 are radially outward from the second circumferential damping members 64. According to the exemplary embodiment of FIG. 1 and other embodiments discussed herein, the first and second damping members 60, 64 are configured as helical (or coil) springs having principal axes oriented substantially circumferentially. Other elastic members may be selected to replace or supplement the springs.

The drive member 56 is fixedly connected to the substantially toroidal portion of the turbine-piston shell 35 of the turbine-piston 32, such as by weld 55, which may be a continuous, annular weld. The output side of the drive member 56 has a plurality of driving tabs 57 (FIG. 1) extending axially in the direction away from the turbine-piston 32. The driving tabs 57 of the drive member 56 are circumferentially equidistantly spaced from one another, and engage first circumferential ends of the first damping members 60.

The intermediate member 58 has a plurality of driven tabs 59 extending axially in an opposition direction to the driving tabs 57 of the drive member 56. The driven tabs 59 of the intermediate member 58 are circumferentially equidistantly spaced from one another, and engage the opposite second circumferential ends of the first damping members 60 than the driving tabs 57. The intermediate member 58 and the driven tabs 59 of the damper assembly 16 are rotatable relative to the drive member 56 and the driving tabs 57 due to elasticity of the first damping members 60, which absorb torsional vibration.

Additionally, the driving tabs 57 of the drive member 56 are axially movable relative to the driven tabs 59 of the intermediate member 58. This relative axial movement between the driving tabs 57 and the driven tabs 59 may become necessary during axial movement of the turbine-piston shell 35 between its lockup and non-lockup modes. As discussed in greater detail below, when the turbine-piston shell 35 shifts axially due to a lockup event, the driving tabs 57 move axially relative to the driven tabs 59. Thus, the drive member 56 is both axially and circumferentially moveable relative to the intermediate member 58, and generally to the damping assembly 16.

The radially inner portion of the intermediate member 58 forms or is connected to, and may be integrally formed as a single piece with, a first disk part 68 on a first side of the second damping members 64. The first disk part 68 is secured to and non-moveable relative to a second disk part 69 on the opposite side of the second damping members 64, such as by rivets or welding. The first and second disk parts 68, 69 establish an input part to the second damping members 64.

The driven member 62 establishes an output part relative to the second damping members 64. The driven member 62 has windows in which the second damping members 64 are set. The disk parts 68, 69 engage first ends of the second damping members 64, and the driven member 62 engages second ends of the second damping members 64. The disk parts 68, 69 of the intermediate member 58 are thus rotatable relative to the driven member 62, with the second damping members 64 absorbing torsional vibration due to their elasticity.

The driven member 62 is fixedly connected to so as to be non-rotatable relative to the output hub 40. The non-rotatable connection between the driven member 62 and the output hub 40 may be formed by splines or welding. Alternatively, the output hub 40 and driven member 62 may be integrally formed as a single-piece part. A thrust bearing 76 is positioned between the output hub 40 and the first casing shell 18.

As discussed above, the turbine-piston 32 is axially movable toward and away from the impeller shell 20 between a lockup position and a non-lockup (open) position. Axial movement of the turbine-piston 32 is accomplished by changing the pressure difference between the torus chamber 52 and the damper chamber 54 on the opposite sides of the turbine-piston shell 35, as discussed in further detail below. However, when the torque converter 14 is in hydrodynamic transmission mode, the action of the transmission fluid generates axial loads which urge the turbine-piston 32 toward the impeller 30. These loads vary depending on speed, torque, drive, coast, etc. These loads can be sufficiently high to move the turbine-piston 32 into contact with the impeller 30 and into lockup mode prematurely.

The possibility of such premature lockup of the torque converter 14 can be reduced by inserting a linear spring between the side wall of the stator 34 and the turbine-piston shell 35 to bias the turbine-piston away from lockup mode. However, a linear spring exerts a load that is proportion to displacement of the turbine-piston 32. As the turbine-piston 32 moves closer to lockup mode, the linear spring will exert a proportionally greater load. The linear spring can slow the response lockup time of the torque converter 14, particularly as the linear spring proportionally increases its biasing load as the turbine-piston 32 moves close to lockup mode. The increased biasing load exerted by the linear spring near lockup can significantly increase the hydraulic pressure required to move the turbine-piston 32 sufficiently to close the torque converter 14 into the lockup mode, thereby increasing hydraulic pump losses. To overcome these problems, the hydrodynamic torque coupling device 10 of the first illustrated embodiment includes a biasing and bearing device 80 having nonlinear load-displacement characteristics.

As best shown in FIGS. 1 and 4-6, the biasing and bearing device 80 of the first exemplary embodiment includes a nonlinear diaphragm spring 82, a turbine-side retainer member (or cage) 84 connected to and non-rotatable relative to the turbine-piston 32, in particular the turbine-piston shell 35 of the turbine-piston 32, and a stator-side retainer member (or cage) 86 connected to and non-rotatable relative to the stator 34. The nonlinear diaphragm spring 82 is positioned between the turbine-side retainer member 84 and the stator-side retainer member 86. The nonlinear diaphragm spring 82 is rotatable relative to at least one of the turbine-side retainer member 84 and the stator-side retainer member 86. Anti-friction material may be situated at the interface of the nonlinear diaphragm spring 82 and the retainer member(s) 84 and/or 86 with which the nonlinear diaphragm spring 82 is rotatable. The anti-friction material may be, for example, a thermoplastic coating or washer. The nonlinear diaphragm spring 82 optionally may be fixed, such as by welding, to either the turbine-side retainer member 84 or the stator-side retainer member 86.

Figure 7:
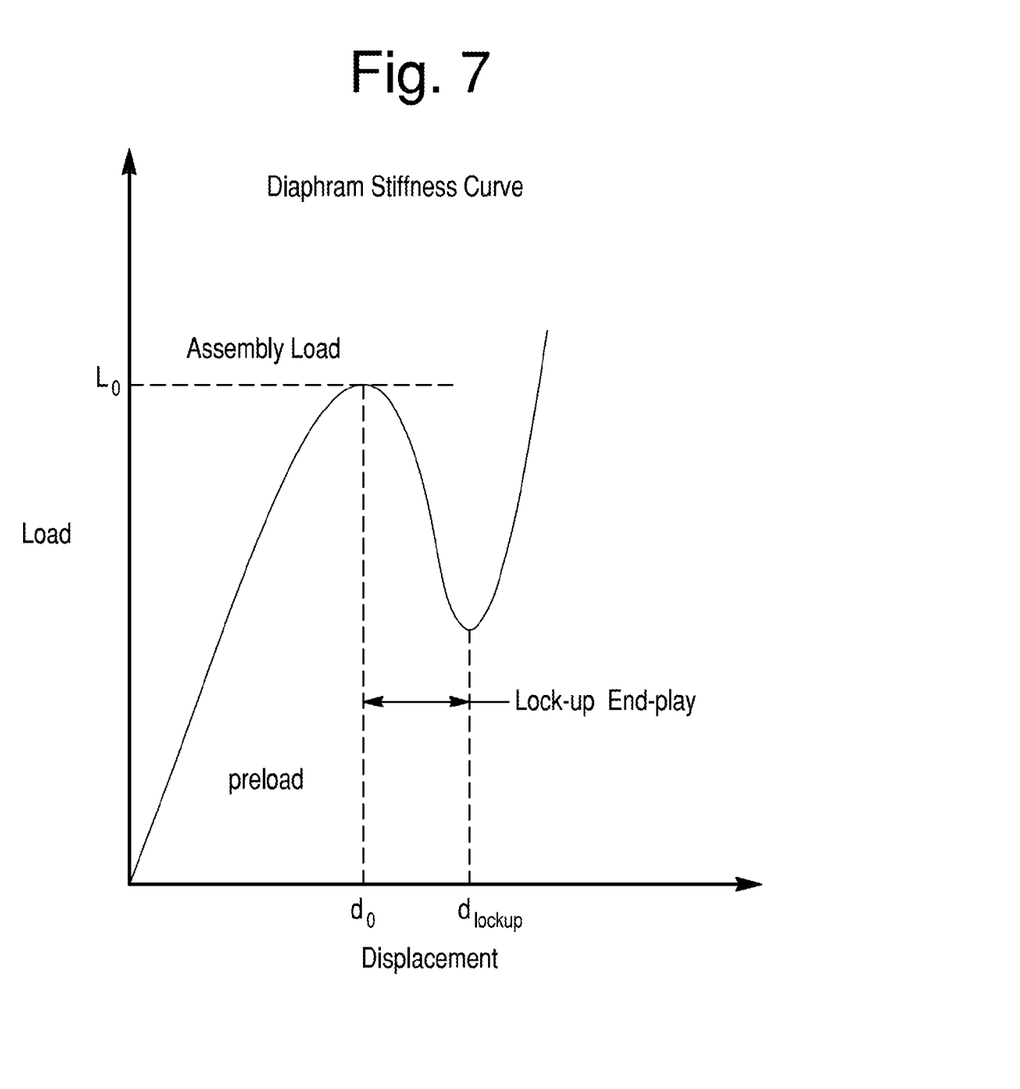
FIG. 7 is a diagram of displacement (x-axis) versus load (y-axis) for a nonlinear spring according to an exemplary embodiment of the invention.

FIG. 7 shows the load-displacement diagram of an exemplary nonlinear biasing device, such as the nonlinear diaphragm spring 82 of the first exemplary embodiment. The axial displacement $d_0$ of the nonlinear diaphragm spring 82 in FIG. 7 corresponds to the turbine-piston 32 in a position farthest away from its lockup mode, as embodied in FIG. 1 by the end of the flange 37 abutting the output hub 40. At the axial displacement $d_0$, the nonlinear diaphragm spring 82 is preloaded to exert a load $L_0$, as shown in FIG. 7. As described above, the flange 37 slides axially with respect to the output hub 40, with O-ring 44 maintaining a seal. The axial displacement $d_{lockup}$ corresponds to the axial position of the turbine-piston 32 in lockup mode, with the first engagement surface $24_1$ frictionally engaged with the friction liner 48 of the second engagement surface $38_2$ to mechanically lock the turbine-piston 32 in non-rotatable relationship with the casing 12.

The nonlinear diaphragm spring 82 is configured to exert an axial load against the turbine-piston 32 to urge the turbine-piston 32 axially away from and out of the lockup mode. As the hydraulic pressure in the damper chamber 54 is increased relative to the torus chamber 52 to overcome an initial peak load $L_0$ of the diaphragm spring 82, such as by introducing hydraulic fluid into the damper chamber 54, the turbine-piston 32 moves towards the lockup mode. As shown in the diagram of FIG. 7, the load exerted by the nonlinear diaphragm spring 82 to the turbine-piston 32 decreases as the turbine-piston 32 moves axially from a position corresponding to axial displacement $d_0$ towards the a position corresponding to axial displacement $d_{lockup}$, and increases as the turbine-piston 32 moves axially out of lockup mode towards a maximum axial displacement position corresponding to axial displacement $d_0$ of the nonlinear diaphragm spring 82. In accordance with the exemplary embodiment of FIG. 7, the load-displacement relationship of the diaphragm spring 82 forms a negative slope that is substantially but not quite linear between $d_0$ and $d_{lockup}$, whereby the load exerted by the nonlinear diaphragm spring 82 decreases (substantially proportionally) as the turbine-piston moves from a maximum axial displacement position (shown in FIG. 1) corresponding to $d_0$ to a lockup position corresponding to spring displacement $d_{lockup}$.

The nonlinear diaphragm spring 82 is preloaded with a high load $L_0$ at $d_0$. This preload is desirably sufficiently high to prevent premature lockup of the lockup clutch 50. For example, the nonlinear diaphragm spring 82 may be sufficiently stiff to exert an initial axial load of more than 5 kN at $d_0$ to prevent the turbine thrust load of the torque converter 14 operating in the hydrodynamic transmission mode from prematurely urging the turbine-piston 32 toward the impeller 30. As the hydraulic pressure in the damper chamber 54 increases to overcome the initial load $L_0$ of the nonlinear diaphragm spring 82, the turbine-piston 32 moves towards the lockup mode. As the turbine-piston 32 moves into closer proximity to lockup mode, the nonlinear diaphragm spring 82 correspondingly moves to displacement position $d_{lockup}$ so that the axial load exerted by the diaphragm spring 82 decreases. As a result, as the turbine-piston 32 moved closer to the lockup mode, the axial spring load urging the turbine-piston out of lockup mode decreases, the hydraulic pressure required to close the torque converter 14 into lockup mode is lessened relative to the hydraulic pressure requirements of a linear spring. In lockup mode, the nonlinear diaphragm spring 82 desirably permits the engagement surfaces $24_1$ and $38_2$ (including friction ring 48) to remain in frictional contact and mechanically locked at a turbine load of up to 30 kN.

Axial movement of the turbine-piston 32 is accomplished by changing the pressure differential between the opposite sides of the turbine-piston shell 35, taking into account the biasing load applied by the nonlinear diaphragm spring 82. Referring to FIG. 1, a torus chamber 52 is to the left side of the turbine-piston shell 35, and a damper chamber 54 is to the other (right) side of the turbine-piston shell 35. A pressure increase in the damper chamber 54 relative to the torus chamber 52 (or stated differently a pressure decrease in the torus chamber 52 relative to the damper chamber 54) that is greater than the urging load of the nonlinear diaphragm spring 82 shifts the turbine-piston shell 35 axially in the direction of torque transmission, i.e., towards the output side of the casing 12, that is right to left in FIG. 1, into the lockup mode. On the other hand, a pressure decrease in the damper chamber 54 relative to the torus chamber 52 (or stated differently a pressure increase in the torus chamber 52 relative to the damper chamber 54) acts with the urging load of the nonlinear diaphragm spring 82 to shift the turbine-piston shell 35 and the turbine-piston flange 38 axially against the direction of torque transmission, i.e., towards the input side of the casing, that is left to right in FIG. 1, out of the lockup mode. Pressure changes are created by control of the fluid, e.g., hydraulic fluid or oil, in the chambers 52 and 54.

In the lockup mode, the turbine-piston 32 is displaced axially towards the impeller 30 until the frictional ring 48 of the second engagement surface $38_2$ of the turbine-piston flange 38 (which moves axially with the turbine-piston shell 35) abuts against and is non-rotatably frictionally coupled to the first engagement surface $24_1$ of the casing 12. In the lockup mode, torque is transferred from the engine to the casing 12, then by way of the frictional engagement between surfaces $24_1$ and $38_2$ (including the frictional lining 48 thereof) through the turbine piston shell 35 to the drive member 56 welded thereto, then serially to the damping assembly 16 and the output hub 40. Thereby, the turbine-piston flange 38 and the casing 12 together create a lockup clutch 50 that bypasses the hydrodynamic fluid coupling of the torque converter 14 and mechanically locks the driving and driven shafts to one another.

As the turbine-piston 32 moves axially into the lockup position as described above, the driving tabs 57 of the drive member 56 welded to the turbine-piston shell 35 are axially displaced relative to the driven tabs 59 of the intermediate member 58. The axial movement of the driving tabs 57 relative to the driven tabs 59 allows the intermediate member 58, the driven member 62, and the damping members 60, 64 to remain fixed axially on the output hub 40 while the turbine-piston 32 and the drive member 56 move axially. Notably, the friction ring 48 secured to the second engagement surface $38_2$ may have circumferentially spaced grooves (not shown) extending generally radially so as to fluidly connect the torus chamber 52 and the damper chamber 54 with one another in the lockup mode for cooling friction surfaces of the lockup clutch 50 by the working fluid.

In the non-lockup mode, the turbine-piston 32 is displaced axially away from the impeller 30, axially moving the turbine-piston shell 35 and the turbine-piston flange 38 so that the second engagement surface region $38_2$ (including the frictional lining 48 thereof) is spaced from and no longer non-rotatably frictionally coupled to the first engagement surface region $24_1$. Thus, torque transferred from the engine to the casing 12 does not bypass the torque converter 14 through the lockup clutch 50. Driving tabs 57 move axially towards the driven tabs 59 as the lockup clutch 50 is moved from the lockup mode to the non-lockup mode. Notably, in the non-lockup mode an open fluid passage is established between the first engagement surface $24_1$ of the casing 12 and the second engagement surface $38_2$ for permitting fluid flow between the torus chamber 52 and the damper chamber 54.

In operation, the lockup clutch 50 is generally activated after the hydrodynamic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston.

The turbine-piston 32 both forms the shell component of the turbine and the piston component of the lockup clutch 50, as described above. By consolidating two components that are normally separate from one another into a single component, space is saved in the hydrokinetic torque coupling device 10. This space-saving structure provides several design options. For example, the hydrokinetic torque coupling device 10 can be made smaller and lighter. Alternatively, the free space within the casing 12 can be used to add more additional components, such as damping components.

Figure 8:
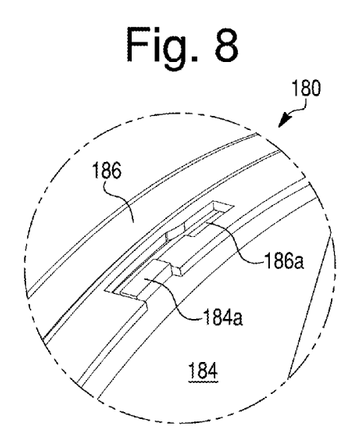
FIG. 8 is a fragmented perspective view of an alternative biasing device in a partially assembled state that may be used in the hydrokinetic torque coupling device of FIG. 1.

Various modifications, changes, and alterations may be practiced with the above-described embodiment. For example, FIG. 8 illustrates an additional exemplary embodiment. In the interest of brevity, reference characters that are discussed above in connection with FIGS. 1-3 are not further elaborated upon below, except to the extent necessary or useful to explain the second exemplary embodiment. Modified components and parts are indicated by the addition of a hundreds digit to the reference numerals of the components or parts for the second exemplary embodiment.

Figure 9:
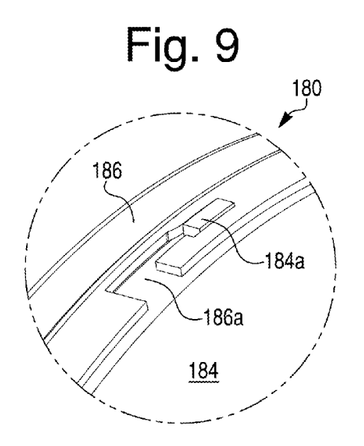
FIG. 9 is a fragmented perspective view of the alternative biasing device of FIG. 8 in an assembled state.
Figure 10:
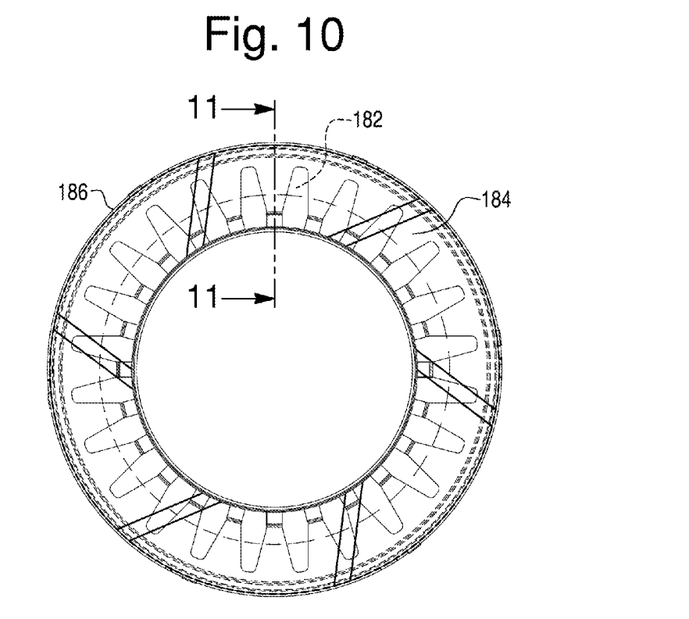
FIG. 10 is a front partially transparent view of the biasing device of FIGS. 8 and 9.
Figure 11:
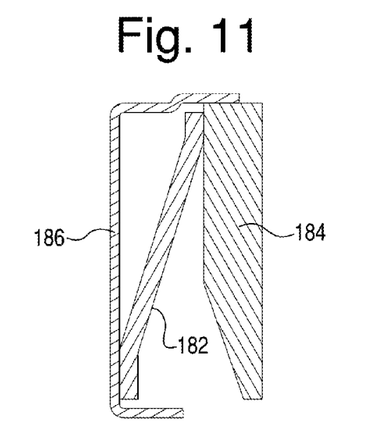
FIG. 11 is a side sectional view taken along section line XI-XI of FIG. 10.
Figure 12:
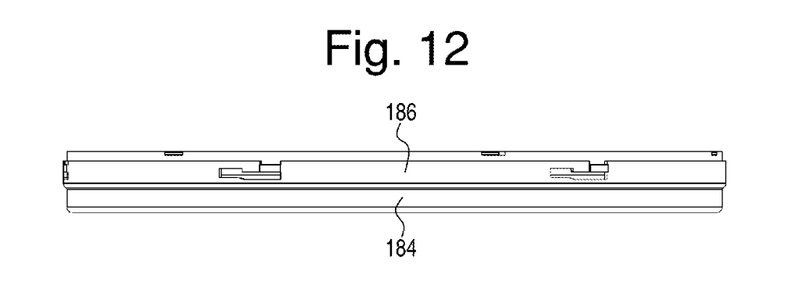
FIG. 12 is a bottom view of the biasing device of FIGS. 8-11.

FIGS. 8-12 depict a biasing device 180 according to an alternative embodiment of the invention. The biasing device 180 is embodied as a bayonet connector. The biasing device 180 includes a Belleville washer or diaphragm spring 182 received between a first (front) housing member 184 embodied as a thrust washer and a second (rear) housing member 186 embodied as a cage member. As best shown in FIGS. 8 and 9, the second housing member 186 includes a substantially L-shaped slot 186a for receiving a locking pin 184a of the first housing member 184. FIG. 8 shows the locking pin 184 in an unlocked and partially disassembled state, and FIG. 9 shows the locking pin 184a fully received in the slot 186a in a locked and fully assembled state. The biasing device 180 operates in the manner described above with respect to the biasing device 80 and generally depicted in FIG. 7. The load of the diaphragm spring 182 is set at a maximum $L_0$ for operation in the torque converter transmission mode, and the load of the biasing device 180 decreases as the turbine-piston moves into lockup mode, as represented by $d_{lockup}$ in FIG. 7.

Figure 13:
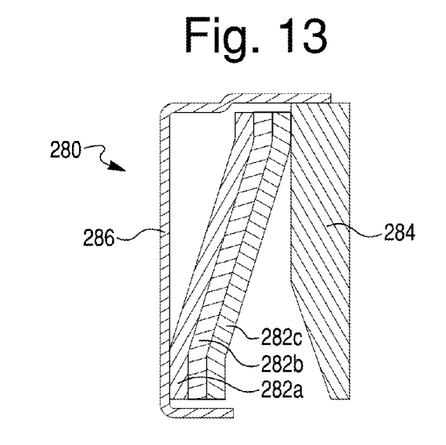
FIG. 13 is a sectional view similar to FIG. 11 of still another alternative biasing device.

FIG. 13 depicts a biasing device 280 according to still another embodiment of the invention. The biasing device 280 is also embodied as a bayonet connector. The biasing device 280 includes a plurality of Belleville washers or diaphragm springs 282a, 282b, and 282c received between a first (front) housing member 284 embodied as a thrust washer and a second (rear) housing member 286 embodied as a cage member. Although three Belleville washers 282a-282c are shown in FIG. 13, it should be understood that the embodiment may be modified to include two, four, five, or other numbers of Belleville washers/diaphragm springs. Although not shown, the second housing member 286 includes a substantially L-shaped slot for receiving a locking pin of the first housing member in a manner similar to that shown in FIGS. 8 and 9. The biasing device 280 operates in the manner described above with respect to the biasing device 80 and generally depicted in FIG. 7. The collective load of the diaphragm spring 182a, 182b, 182c is set at a maximum $L_0$ for operation in the torque converter transmission mode at $d_0$ in FIG. 7, and the load of the biasing device 180 decreases as the turbine-piston moves into lockup mode, as represented by $d_{lockup}$ in FIG. 7.

Other variations and modifications include modifying the damper assembly 16 to include only damping members 60 or damping members 64, or to include additional or no damping members. The features of the above-described embodiments may be practiced with one another and are substitutable in numerous combinations.

An exemplary method for assembling the hydrokinetic torque coupling device 10 according to the embodiment of FIGS. 1-7 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque coupling devices may be practiced by sequentially performing the steps as set forth below, it should be understood that the methods may involve performing the steps in different sequences.

The impeller 30, the turbine-piston 32, the stator 34, the biasing device 80, and the damper assembly 16 may each be preassembled. The turbine-piston 32 includes, as noted above, the turbine-piston shell 35 the turbine blades 36 attached to the turbine-piston shell 35, and the turbine-piston flange 38.

The impeller 30, the stator 34, the biasing device 80, and the turbine-piston 32 subassemblies are assembled together as shown in the drawings. The biasing device 80 is situated between the stator 34 and the turbine-piston shell 35 during assembly of the torque converter 14. The cylindrical flange 37 of the turbine-piston 32 is mounted to slidingly engage the output hub 40 (which is splined with or mounted on the driven shaft) with the seal 44 therebetween. The damper assembly 16 is added. The driving tabs 57 are engaged with the damper assembly 16 as described above. Then, the first casing shell 18 is non-moveably and sealingly secured, such as by welding at 19, to the second casing shell 20, as best shown in FIG. 1.

Figure 14:
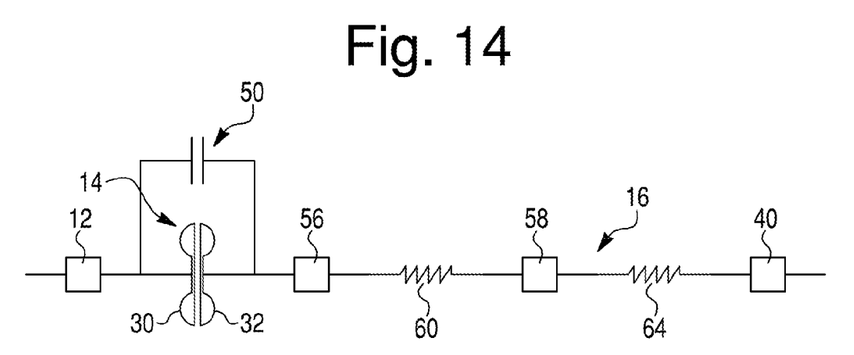
FIG. 14 is a simplified diagram of a hydrodynamic torque coupling device including a turbine-piston with a dual or double damper assembly.

The torque converters and hydrodynamic torque coupling devices described herein may incorporate different damper assemblies. For example, FIG. 14 shows a hydrodynamic torque coupling device including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60, the intermediate member 58, and the elastic damping members 64 of the damper assembly 16 and the output hub 40 are arranged serially downstream of the turbine-piston shell 35 and the drive member 56 in FIG. 14. The diagram of FIG. 14 generally corresponds to the arrangement of the embodiment shown in FIG. 1.

Figure 15:
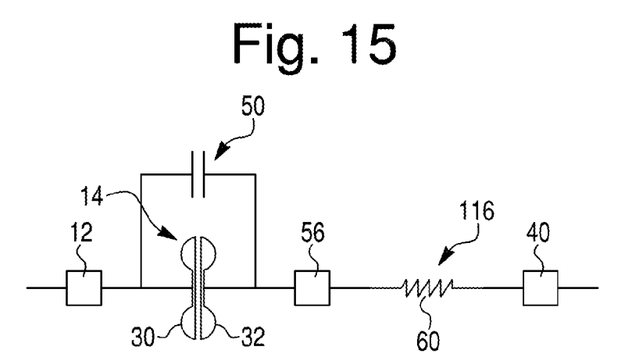
FIG. 15 is a simplified diagram of another hydrodynamic torque coupling device including a turbine-piston with a single damper assembly.

FIG. 15 shows an alternative damper assembly 116 similar to that of FIG. 14, but in which the damper assembly 116 is modified to include only one set of circumferentially extending elastic damping members 60.

Figure 16:
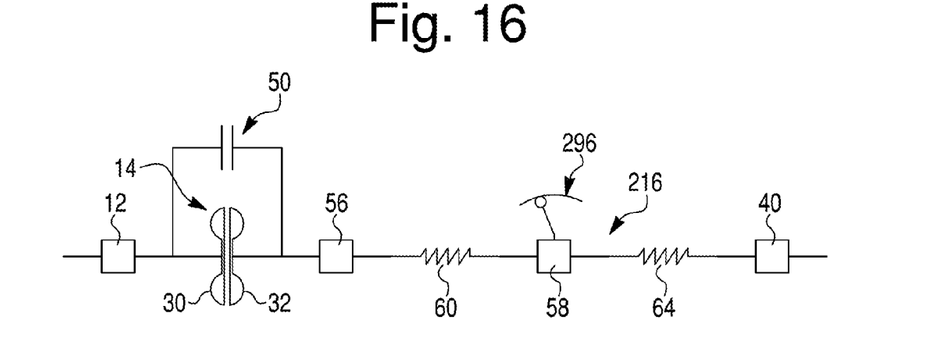
FIG. 16 is a simplified diagram of still another hydrodynamic torque coupling device including a turbine-piston with dual or double damper assemblies and a pendulum vibration absorber.

A damper assembly 216 shown in FIG. 16 is similar to that of FIG. 14, but further includes a centrifugal pendulum oscillator 296 coupled to the intermediate member 58. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 296 may be coupled to the circumference of the intermediate member 58 and may be arranged on both sides of the intermediate member 58.

Figure 17:
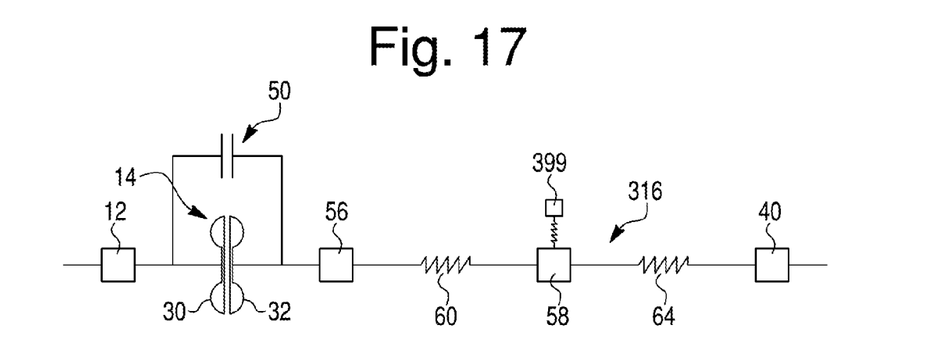
FIG. 17 is a simplified diagram of a further hydrodynamic torque coupling device including a turbine-piston with dual or double damper assemblies and a vibration absorbing spring-mass system.

A damper assembly 316 shown in FIG. 17 is similar to that of FIG. 14, but further includes a spring mass system 399 coupled to the intermediate member 58. Spring-mass systems are well known in the art and described in, for example, WO 2004/018897 to Haller. The spring-mass system 99 may be coupled to the circumference of the intermediate member 58. The spring of the spring-mass system 399 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the torque coupling device comprising:
   an impeller rotatable about a rotational axis and comprising an impeller shell;
   a casing comprising the impeller shell and a casing shell fixedly connected thereto so as to be non-rotatable relative to the impeller shell, the casing having a first engagement surface;
   a turbine-piston hydrodynamically drivable by the impeller and comprising a turbine-piston shell having a second engagement surface facing the first engagement surface, the turbine-piston being axially displaceable relative to the impeller between a hydrodynamic transmission mode in which the first and second engagement surfaces are spaced from and not frictionally engaged with one another, and a lockup mode in which the first and second engagement surfaces are frictionally engaged with one another to mechanically lock the turbine-piston with the casing so as to be non-rotatable relative to the casing; and
   a biasing device configured to exert an axial load against the turbine-piston to urge the turbine-piston axially away from the lockup mode and towards the hydrodynamic transmission mode, wherein the axial load exerted by the biasing device decreases as the turbine-piston moves axially towards the lockup mode and increases as the turbine-piston moves axially away from the lockup mode.

2. The hydrokinetic torque coupling device of claim 1, wherein the biasing device exerts a nonlinear load against the turbine-piston to urge the turbine-piston axially away from the lockup mode and towards the hydrodynamic transmission mode, wherein the nonlinear load exerted by the biasing device is not proportional to displacement of the turbine-piston between the lockup mode and the hydrodynamic transmission mode.

3. The hydrokinetic torque coupling device of claim 1, further comprising a stator situated between the impeller and the turbine-piston.

4. The hydrokinetic torque coupling device of claim 3, wherein the biasing device is situated between the stator and the turbine-piston shell.

5. The hydrokinetic torque coupling device of claim 4, wherein the biasing device is part of a biasing and bearing device which comprises:
   a stator-side retainer member connected to and non-rotatable relative to the stator;
   a turbine-side retainer member connected to and non-rotatable relative to the turbine-piston; and
   the biasing device situated between the stator-side retainer member and the turbine-side retainer member.

6. The hydrokinetic torque coupling device of claim 5, wherein the biasing device is rotatable relative to one of the turbine-side retainer member and the stator-side retainer member and fixedly connected to the other of the turbine-side retainer member and the stator-side retainer member.

7. The hydrokinetic torque coupling device of claim 5, wherein the biasing device is rotatable relative to at least one of the turbine-side retainer member and the stator-side retainer member.

8. The hydrokinetic torque coupling device of claim 5, wherein the turbine-side retainer member is mounted on the turbine-piston shell.

9. The hydrokinetic torque coupling device of claim 1, wherein the biasing device comprises a diaphragm spring.

10. The hydrokinetic torque coupling device of claim 1, wherein the biasing device comprises a Belleville washer.

11. The hydrokinetic torque coupling device of claim 10, wherein the Belleville washer is fixedly connected to the turbine-piston shell.

12. The hydrokinetic torque coupling device of claim 11, wherein the biasing device further comprises a thrust washer connected to and non-rotatable relative to the stator, the thrust washer contacting and being rotatable relative to the Belleville washer.

13. The hydrokinetic torque coupling device of claim 1, wherein the biasing device comprises a bayonet connector.

14. The hydrokinetic torque coupling device of claim 13, wherein the bayonet connector comprises first and second bayonet housing members and at least one Belleville spring housed between the first and second bayonet housing members.

15. The hydrokinetic torque coupling device of claim 1, wherein the first engagement surface or the second engagement surface comprises a frictional lining.

16. The hydrokinetic torque coupling device of claim 1, wherein the turbine-piston shell further comprises a radially extending flange defining the second engagement surface.

17. A hydrokinetic torque coupling device for coupling together a driving shaft and a driven shaft, the torque coupling device comprising:
an impeller rotatable about a rotational axis and comprising an impeller shell;
a casing comprising the impeller shell and a casing shell fixedly connected to so as to be non-rotatable relative to the impeller shell, the casing having a first engagement surface;
a turbine-piston hydrodynamically drivable by the impeller and comprising a turbine-piston shell having a second engagement surface facing the first engagement surface, the turbine-piston being axially displaceable relative to the impeller between a hydrodynamic transmission mode in which the first and second engagement surfaces are spaced from and not frictionally engaged with one another, and a lockup mode in which the first and second engagement surfaces are frictionally engaged with one another to mechanically lock the turbine-piston with the casing so as to be non-rotatable relative to the casing;
a stator situated between the impeller and the turbine-piston;
a biasing device configured to exert an axial load against the turbine-piston to urge the turbine-piston axially away from the lockup mode and towards the hydrodynamic transmission mode, wherein the axial load exerted by the biasing device decreases as the turbine-piston moves axially towards the lockup mode and increases as the turbine-piston moves axially away from the lockup mode;
an output hub; and
a damper assembly interconnecting the turbine-piston to the output hub.

18. The hydrokinetic torque coupling device of claim 17, further comprising a drive member interconnecting the turbine-piston shell to the damper assembly, wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a centrifugal pendulum oscillator mounted to the intermediate member.

19. The hydrokinetic torque coupling device of claim 17, further comprising a drive member interconnecting the turbine-piston shell to the damper assembly, wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a spring mass system coupled to the intermediate member.

20. A method of assembling a hydrokinetic torque coupling device for coupling a driving shaft and a driven shaft together, comprising:
providing a torque converter rotatable about a rotational axis and comprising
an impeller comprising an impeller shell;
a turbine-piston hydrodynamically drivable by the impeller and comprising a turbine-piston shell; and
a biasing device; and
operatively connecting a casing shell to the impeller shell of the torque converter to form a casing that is rotatable about the rotational axis and has a first engagement surface, the turbine-piston having a second engagement surface and being axially displaceable relative to the impeller between a hydrodynamic transmission mode in which the first and second engagement surfaces are spaced from and not frictionally engaged with one another, and a lockup mode in which the first and second engagement surfaces are frictionally engaged with one another to mechanically lock the turbine-piston with the casing so as to be non-rotatable relative to the casing,
wherein the biasing device is configured to exert an axial load against the turbine-piston to urge the turbine-piston axially away from the lockup mode and towards the hydrodynamic transmission mode, wherein the axial load exerted by the biasing device decreases as the turbine-piston moves axially towards the lockup mode and increases as the turbine-piston moves axially towards the hydrodynamic transmission mode.

* * * * *